United States Patent [19]

Heinze et al.

[11] Patent Number: 4,680,376
[45] Date of Patent: Jul. 14, 1987

[54] PROCESS FOR THE CONTINUOUS PRODUCTION OF HIGH-MOLECULAR POLYBUTYLENETEREPHTHALATE

[75] Inventors: Helmut Heinze, Frankfurt; Fritz Wilhelm, Karben, both of Fed. Rep. of Germany

[73] Assignee: Davy McKee A.G., Fed. Rep. of Germany

[21] Appl. No.: 871,000

[22] Filed: Jun. 5, 1986

[30] Foreign Application Priority Data

Dec. 17, 1985 [DE] Fed. Rep. of Germany ....... 3544551

[51] Int. Cl.[4] ..................... C08G 63/04; C08G 63/34
[52] U.S. Cl. .................................... 528/279; 528/283
[58] Field of Search ................................ 528/279, 283

[56] References Cited

U.S. PATENT DOCUMENTS 4,014,858 3/1977 Chipman et al. .................... 528/283
4,499,261 2/1985 Heinze et al. ....................... 528/279

*Primary Examiner*—Lucille M. Phynes
*Attorney, Agent, or Firm*—Allegretti, Newitt, Witcoff & McAndrews, Ltd.

[57] ABSTRACT

A process for continuous production of high molecular polybutyleneterephthalate by direct esterification of terephthalic acid and 1,4 butanediol in the presence of tin- or titanium-containing catalysts at preferred temperatures of 235° to 250° C., and preferred pressures of 0.3 to 0.6 bar during the first stage—with minimal formation of tetrahydrofurane—followed by precondensation and polycondensation at reduced pressure.

7 Claims, 1 Drawing Figure

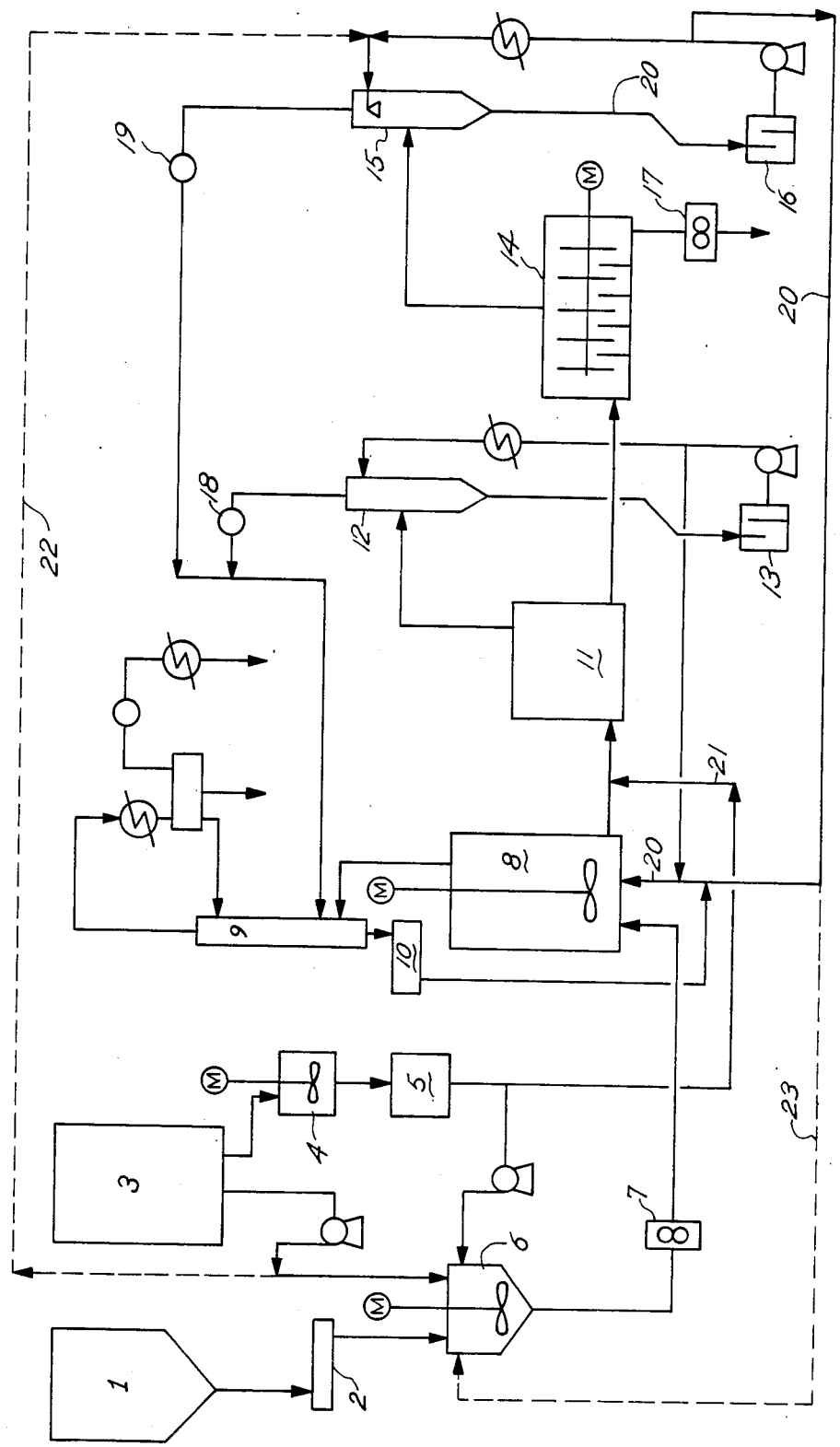

PROCESS FOR THE CONTINUOUS PRODUCTION OF HIGH-MOLECULAR POLYBUTYLENETEREPHTHALATE

The present invention concerns a process for the continuous production of high molecular polybutyleneterephthalate which proceeds from the reaction between terephthalic acid and 1,4-butanediol.

THE PRIOR ART

The discontinuous esterification of terephthalic acid and 1,4-butanediol has been described frequently in patents, as well as the discontinuous polycondensation of the esterification product. It is also known to discontinuously carry out the esterification of terephthalic acid with diols, such as 1,4-butanediol, and the subsequent polycondensation in the presence of titanium-containing catalysts, such as, for example, described in German application No. 2,210,655. It is likewise known to carry out such an esterification in the presence of tin-containing catalysts, such as, for example, described in the U.S. Pat. Nos. 3,936,421 and 4,329,444.

In a number of patents, it has been noted that the process parameters cited could be applied to a continuous process, but without documentation through supporting examples or discussion of its practicability.

It is generally attempted to carry out the process of esterification and polycondensation so that as few secondary reactions occur as possible, and so that the least possible amount of 1,4-butanediol (which is considerably more expensive than terephthalic acid) is lost through the formation of tetrahydrofurane (THF), which is particularly critical during the first stage, that is, during the esterification reaction.

The parameter combinations indicated as optimal for the discontinuous esterification of terephthalic acid with 1,4-butanediol in accordance with the state of art (for example, German application Nos. 1,135,660; 2,120,092; and 2,621,099; Ep patent No. 0,046,670), especially as regards to molar ratio, temperature and pressure during the first stage, have, however, in no way proven favorable or acceptable during continuous execution of the process. One reason for this is to be seen in the chemical compostition of the reaction mixtures which is basically different in discontinuous and continuous process operation. There also exists a connection with the hydrolysis sensitivity of the catalysts used, that is, with the decrease of their catalytic effectiveness by partial reaction with the water which arises from esterification and from THF formation.

THE INVENTION

The object of the present invention is to provide a continuous and economical process for producing polybutyleneterephthalate from terephthalic acid and 1,4-butanediol, in which the smallest possible amounts of 1,4-butanediol are lost through secondary reactions, especially through the formation of tetrahydrofurane (THF). This primarily concerns the execution of the first stage, that is, the esterification of terephthalic acid with 1,4-butanediol.

Another object is to obtain an esterification product that can be continuously polycondensed up to high viscosities, with minimal THF-formation.

In accordance with the invention, these objects are achieved by a process for the continuous production of high molecular polybutyleneterephthalate by esterification of terephthalic acid with 1,4-butanediol in the presence of organo-tin and/or organo-titanium compounds, and subsequent polycondensation of the esterification product obtained, which is characterized in that:

(a) a terephthalic acid/1,4-butanediol paste containing catalyst is continuously fed into the first esterification reactor as the beginning process stage;

(b) the 1,4-butanediol distilled from the first stage and the following process stages is cycled back to the first stage after the separation from water and tetrahydrofurane;

(c) the total 1,4-butanediol fed into the first stage equals 2 to 3.8 preferably 2.5 to 3.5 moles per mole terephthalic acid;

(d) the esterification is carried out during the first stage at temperatures of 225° to 260° C., preferably 235° to 250° C.;

(e) the esterification is carried out during the first stage at absolute pressures of 0.1 up to a maximum of 1 bar, preferably 0.3 to 0.6 bar;

(f) the esterification product from the first stage is precondensed during a second stage at temperatures of 230° to 260° C. and at pressures of 10 to 200 mbar; and (g) the precondensate obtained is continuously polycondensed in a standard polycondensation apparatus at temperatures of 240° to 265° C. and at pressures of 0.25 to 25 mbar.

The organo-titanium and/or organo-tin compounds, such as tetrabutyl-o-titanate and alkylstannic acids or the anhydrides of the latter are all useful as catalysts. Catalyst quantities range from 0.005 to 0.2 weight %, preferably 0.02 to 0.08 weight % of titanium and/or tin, relative to the terephthalic acid. The catalyst is dissolved in anhydrous 1,4-butanediol, and if necessary, heated to about 80° C., and added to the paste mixer together with the terephthalic acid and further 1,4-butanediol, and then fed into the first stage of the process.

To attain particularly high viscosities of the polybutyleneterephthalate, for example, intrinsic viscosities above 1.15, it can be necessary to continuously feed in a certain additional amount of catalyst, particularly during the second process stage, in the form of a solution of organo-titanium or organo-tin catalysts in 1,4-butanediol, in quantities of 0.002 to 0.02 weight % of titanium or tin, relative to the terephthalic acid. The feeding of the catalyst is particularly necessary if, during the first stage, as a result of the special process conditions, the activity of the catalyst due to hydrolysis has been greatly reduced.

The molar ratio of terephthalic acid to 1,4-butanediol in the feed paste lies between 1:0.8 and 1:1.7. The paste is prepared with fresh 1,4-butanediol, with, if necessary, partial addition of recirculated 1,4-butanediol free of water and THF.

To reach 90% conversion of terephthalic acid as a minimum degree of esterification in the first reactor stage of the continuous process with a simultaneous minimization of tetrahydrofurane-formation, it was necessary to use for the first stage in accordance with the invention:

(a) a relatively high feed-in molar ratio, preferably in the range of 1:2.5 to 1:3.5;

(b) a relatively high temperature, that is, preferably from 235° to 250° C.; and (c) a lowered absolute pressure, preferably in the range of 0.3 to 0.6 bar.

The amount of 1,4-butanediol which is necessary to maintain the molar ratio specified by the invention is based on the fresh butanediol and the butanediol which is distilled off from the individual stages of the continuous process and is recycled into the first stage, after the separation of water and THF. The fresh butanediol can be used, before it serves for the preparation of the paste, either partially or completely for the condensation of the vapors in the subsequent reaction stages, for example, in spray condensors.

It is uneconomical to use higher molar ratios than those specified by the invention, since the energy expenditure for distilling the butanediol is correspondingly increased, without significantly less THF being formed during the overall process.

Raising the reaction temperature during the first stage above 250° C. results in increasing technical problems from the higher esterification speed or excessively short reaction time with pronounced foaming of the melt product and increased sublimation of the terephthalic acid. Thus, the reaction process becomes unstable, the continuous rectification in the vacuum becomes susceptible to failure, and the quality of the product becomes unstable.

We have determined that, in continuous esterifications with equal terephthalic acid conversion rates, the lower the absolute pressure, the less tetrahydrofurane is obtained. An absolute pressure of 0.3 to 0.6 bar in the first stage is recommended. Further reductions of pressure in this stage are technically expensive and it is uneconomical to operate the connected columns and to produce the necessary vacuum under simultaneous condensation of the THF.

The process of the precondensation and the polycondensation reaction is decidedly dependent on the reaction conditions in the first stage and on the esterification product obtained during this stage. The polycondensation takes place in the usual polycondensation apparatus, for example, in a ring-disk reactor in accordance with U.S. Pat. No. 3,617,225.

The continuous process in accordance with the invention is preferably carried out in three stages. It can, however, be carried out in two stages, by uniting the precondensation and the polycondensation into a single stage, for example, if a not very high viscosity polybuteneterephthalate is to be produced. It can also be carried out in four stages, for example, if two precondensation stages are provided, in order to attain a correspondingly higher degree of esterification in the prepolymer.

The vapors of the precondensation and polycondensation stage, which contain 0.03 to 0.06 mol THF per mol of terephthalic acid, are fractionally condensed. The lower boiling condensates, that is, the ones which contain mainly water and THF, are conducted to the distillation column on the first reactor stage.

In this manner, it is possible to completely condense and process the relatively low-boiling THF which still accumulates, even if in comparatively small quantities.

SPECIFIC EXAMPLES

The present invention is explained in greater detail through the following examples:

EXAMPLES 1–24

It is shown by means of the examples what influence the most important reaction conditions have on the esterification process and on the conversion of the terephthalic acid, and simultaneously on the formation of tetrahydrofurane (THF), if terephthalic acid (TA) and 1,4-butanediol (BD) are continuously esterified in the presence of a titanium catalyst.

To carry out the tests, the tetrabutyl-o-titanate which served as catalyst was dissolved in the quantity of 1,4-butanediol provided for the production of paste by stirring and moderate heating. 1.15 moles of the titanium-catalyst containing butanediol were mixed with one mole of commercially-available terephthalic acid, to form a well-flowing feed-paste.

A jacketed stainless steel reactor vessel with a product inlet nozzle at the bottom, a product overflow exit with suitable devices for a steady removal and cooling of the product, further with a heated cover containing a central stirrer and excentrical fittings for the product thermometer and the vapor outlet is used for continuous process operation. The vapors are conducted to a falling cooler connected with alternate collecting vessels, each vented over two freezing traps in series. The final trap is cooled with liquid nitrogen, in order to completely condense the departing THF, even at below atmospheric pressure.

The start-up of the reactor is done with premelting and stirring of an esterification product from a previous test run under atmospheric pressure.

After attainment of the final temperature the BD/TA paste is pumped into the reactor at constant speed. According to the higher total BD-feed ratios shown by Table I, additional BD is fed separately via the paste inlet nozzle.

With establishment of a constant exit flow the reference pressure indicated in Table I is adjusted. Each hour, esterification products and distillates are removed, weighed out and analyzed for the conversion of the terephthalic acid as well as gas chromatographically-tested for THF content. The tests are carried out for as long as necessary for all hourly product and distillate quantities and their analytic figures to remain constant. The residence times are determined with consideration to the amount of product in the reactor.

The degree of esterification of the terephthalic acid (U) is calculated according to the equation:

$$U = \frac{VZ - SZ}{VZ} \cdot 100(\%),$$

in which:
VZ=Saponification figure (mg KOH/g); and
SZ=Acid figure (mg KOH/g) of the esterification product measured in every sample.

The essential conditions and results of the tests are summarized in Table I:

TABLE I

Influence of the reaction conditions on the degree of esterification (U) of terephthalic acid and the formation of tetrahydrofurane (THF) in the continuous esterification of terephthalic acid (TA) and 1,4-butanediol (BD) in the presence of the Ti-catalyst:

| Example No. | Mols BD Per Mol TA | Temp (°C.) | Abs. Pressure (Bar) | Weight % of Ti Based on TA | Residence Time (Min.) | U (%) | Mols THF Per Mol TA |
| --- | --- | --- | --- | --- | --- | --- | --- |
| 1  | 3.0  | 210 | 1    | 0.112 | 68  | 66 | 0.20 |
| 2  | 2.5  | 225 | 1    | 0.015 | 130 | 83 | 0.22 |
| 3  | 2.5  | 225 | 1    | 0.028 | 89  | 77 | 0.18 |
| 4  | 2.2  | 230 | 1    | 0.028 | 146 | 78 | 0.22 |
| 5  | 2.5  | 235 | 1    | 0.015 | 130 | 89 | 0.26 |
| 6  | 2.0  | 240 | 1    | 0.028 | 134 | 82 | 0.23 |
| 7  | 2.0  | 240 | 1    | 0.028 | 85  | 69 | 0.17 |
| 8  | 2.0  | 230 | 0.65 | 0.028 | 301 | 85 | 0.23 |
| 9  | 2.5  | 245 | 0.65 | 0.056 | 65  | 96 | 0.15 |
| 10 | 2.75 | 245 | 0.65 | 0.056 | 65  | 98 | 0.15 |
| 11 | 2.2  | 230 | 0.55 | 0.028 | 271 | 84 | 0.21 |
| 12 | 3.0  | 250 | 0.55 | 0.056 | 50  | 97 | 0.13 |
| 13 | 2.2  | 230 | 0.44 | 0.028 | 252 | 81 | 0.18 |
| 14 | 2.5  | 230 | 0.44 | 0.056 | 160 | 80 | 0.15 |
| 15 | 3.0  | 230 | 0.44 | 0.056 | 156 | 98 | 0.14 |
| 16 | 3.0  | 235 | 0.44 | 0.056 | 120 | 97 | 0.14 |
| 17 | 2.2  | 240 | 0.44 | 0.056 | 257 | 81 | 0.16 |
| 18 | 2.75 | 240 | 0.44 | 0.056 | 73  | 93 | 0.09 |
| 19 | 3.0  | 240 | 0.44 | 0.056 | 90  | 97 | 0.13 |
| 20 | 3.0  | 240 | 0.44 | 0.056 | 67  | 95 | 0.09 |
| 21 | 3.0  | 245 | 0.44 | 0,056 | 64  | 97 | 0.10 |
| 22 | 3.0  | 245 | 0.44 | 0.056 | 45  | 94 | 0.08 |
| 23 | 3.0  | 250 | 0.44 | 0.056 | 48  | 96 | 0.09 |
| 24 | 3.0  | 240 | 0.36 | 0.056 | 75  | 95 | 0.08 |

From this table, it can easily be seen that only by maintaining all conditions for the first process stage specified in the present invention an esterification product with high terephthalic acid conversion of at least 90%, as well as a minimum THF formation level, for example, below 10 mol % THF, relative to the terephthalic acid can be obtained at the same time.

The corresponding experiments at normal pressure (see examples 1 to 7) show a 2- to 3-fold THF formation at even substantially lower extent of the terephthalic acid esterification.

EXAMPLES 25–32

It is shown in these examples what influence the most important test conditions have on the degree of esterification of the terephthalic acid and simultaneously on the formation of tetrahydrofurane, if terephthalic acid and 1,4-butanediol are continuously esterfied in the presence of a tin catalyst.

The tests were carried out in the same way as examples 1 to 24, with the only difference being that, instead of tetrabutyl-o-titanate, the Sn-catalyst butylstannic acid ($C_4H_9.Sn\ O(OH)$) was used.

The conditions and results of these tests are summarized in Table II.

conditions preferred in accordance with the invention are maintained.

EXAMPLE 33

In this example, an advantageous form of execution of the present invention is presented with reference to the schematic flow sheet of the process (FIG. 1). The product quantities are given in weight parts.

In the mixing vessel 4, a solution of 4 weight % of tetrabutyl-o-titanate in 1,4-butanediol is produced by heating to about 80° C., and then discharged in the container 5.

613 weight parts per hour of terephthalic acid (TA) are transferred from the silo 1 into the paste mixer 6 via the dosing device 2. At the same time, 328 weight parts of 1,4-butanediol (BD) from tank 3, and 46 parts of the catalyst solution from vessel 5 containing 0.2575 parts of titanium are pumped to the paste mixer 6, in which a homogeneous BD/TA-paste (with mole ratio 1.125) is prepared. From the bottom of the paste mixer the paste is charged to the esterification reactor 8 by means of a dosing pump 7 with a constant feed rate of 987 parts per hour. At the same time, 615 parts BD per hour (additionally 1.85 moles BD per mole TA) are fed into the reactor 8 via the recycle line 20. In stable operation, this

TABLE II

| Example No. | Mols BD/ Mol TA | Temp. (°C.) | Abs. Pressure (Bar) | Weight % of Sn Based on TA | Residence Time (Min.) | U (%) | Mols THF/ Mol TA |
| --- | --- | --- | --- | --- | --- | --- | --- |
| 25 | 2.5 | 230 | 1    | 0.034 | 200 | 67 | 0.19 |
| 26 | 2.5 | 235 | 1    | 0.048 | 160 | 80 | 0.18 |
| 27 | 2.0 | 230 | 1    | 0.068 | 90  | 72 | 0.11 |
| 28 | 2.0 | 240 | 1    | 0.068 | 87  | 81 | 0.12 |
| 29 | 2.0 | 245 | 1    | 0.068 | 84  | 81 | 0.11 |
| 30 | 3.0 | 240 | 0.44 | 0.068 | 86  | 93 | 0.12 |
| 31 | 3.0 | 250 | 0.44 | 0.034 | 84  | 86 | 0.13 |
| 32 | 3.0 | 250 | 0.44 | 0.068 | 85  | 94 | 0.12 |

It can be determined that, also when using the tin catalyst, the maximum conversion of the terephthalic acid is attained with a minimum THF formation if the BD flow is a collected stream from the column back flow (10) and the overflows from the distillate collecting vessels 13 and 16 of the second and third stage.

In the reactor 8, the terephthalic acid is converted to 95% at a temperature of 240° C., a pressure of 0.44 bar absolute and a residence time of 71 minutes while stirring. This degree of esterification corresponds to a constant remaining acid figure of the esterification product of 23 mg KOH/g.

The vapors from reactor 8 are fractionated in column 9 into BD contaminated with TA and TA monoester at the bottom (to be recycled via line 20) and a low boiling head product, containing water and THF, which are separated in a further distillation step.

The esterification product flows from the reactor 8 into the reactor 11. Additionally, 11 weight parts per hour of the solution containing 4% catalyst in 1,4-butanediol is fed from the container 5 into reactor 11 via the pipe 21. The further esterification and precondensation takes place at 240° C. and an absolute pressure of 40 mbar in the reactor 11. The residence time here amounts to 24 minutes. The vapors of this second stage are condensed in the spray condensor 12 and collected in vessel 13.

The prepolymer from reactor 11 is fed to the polycondensation reactor 14, where polycondensation is carried out at a pressure of 1.6 mbar and a residence time of 165 minutes, with a gradual rise of the temperature from 240° to 250° C. The polyester is continuously discharged, by means of the gear pump 17, out of the reactor 14.

814 weight parts of polybutylenerephthalate with an intrinsic viscosity of 1.16, measured in phenol-tetrachlorethane 60:40 at 25° C. are obtained per hour.

The vapors from the polycondensation reactor 14 are condensed in the spray condensor 15 and recycled to the process via the collecting vessel 16 and the line 20, together with the condensate from the vessel 13. The condensates from the vacuum devices 18 and 19, which contain mainly THF and water, are conducted into the column 9. The reaction water and 35 weight parts of tetrahydrofurane are distilled off from the column 9. This is, for the entire process, 0.13 mol THF per mol of terephthalic acid used.

The example described above should not imply any limitation, but only one advantageous form of execution of the process in accordance with the invention.

Modifications can exist in the choice of reaction conditions, or for example, in feeding fresh 1,4-butanediol to the spray condensor 15 via the line 22, or in condensate from the collecting vessel 16 being recycled to the paste mixer 6 via the line 23. The 2- or 4-stage version of the process already discussed is a further modification.

A heat exchanger can also be used between the reactors 11 and 14, which permits, for example, to start the polycondensation at lower temperatures than the temperature of the connected reaction stage.

The polybutyleneterephthalates obtained in accordance with the invention can, for example, be processed by injection molding or extrusion. They can be mixed with other polymers, colored with pigments, and provided with additives, for example, glass fibers and/or flame protecting agents. They are also suited for the production of fibers and films.

What is claimed is:

1. In a process for the continuous production of high molecular weight polybutyleneterephthalate by esterification of terephthalic acid with 1,4-butanediol in the presence of organo-tin and/or organo-titanium compounds and the subsequent polycondensation of the esterification product obtained, the improvement comprising:
   (a) continuously feeding a terephthalic acid/1,4 butanediol paste containing said catalyst into the first esterification reactor as the beginning process stage;
   (b) carrying out the esterification during the first stage at temperatures of 225° to 260° C. and at absolute pressures of 0.1 up to a maximum of 1 bar;
   (c) precondensing the esterification product from the first stage during a second stage at temperatures of 230° to 260° C. and at pressures of 10 to 200 mbar;
   (d) continuously polycondensing said precondensate at temperatures of 240° to 265° C. and at pressures of 0.25 to 25 mbar;
   (e) condensing 1,4-butanediol distilled off from said first and following process stages;
   (f) removing water and tetrahydrofurane from said condensed 1,4-butanediol; and
   (g) recycling said 1,4-butanediol to said first esterification reactor, at a total molar ratio of fresh and recycled 1,4-butanediol to terephthalic acid from 2 to 3.8.

2. The process of claim 1, characterized in that, during the second stage, a solution of the organo-tin or organo-titanium catalyst in 1,4-butanediol is continuously fed to said esterification product in quantities between 0.002 and 0.02 weight % Ti or Sn, relative to the terephthalic acid.

3. The process of claim 1, characterized in that the catalyst is tetrabutyl-o-titanate.

4. The process of claim 1, characterized in that the catalyst is alkylstannic acid or the anhydride thereof.

5. The process of claim 1, characterized in that the temperature of the precondensate is reduced before entering the polycondensation step d.

6. The process of claim 1, characterized in that steps c and d are carried out simultaneously in a single stage in one reactor.

7. The process of claim 1 in which said temperatures and pressure ranges of step b are 235° to 250° C. and 0.3 to 0.6 bar, respectively, and the molar ratio of step g is 2.5 to 3.5.

\* \* \* \* \*